United States Patent
Eyer et al.

[11] Patent Number: 5,982,411
[45] Date of Patent: Nov. 9, 1999

[54] NAVIGATION AMONG GROUPED TELEVISION CHANNELS

[75] Inventors: Mark K. Eyer, San Diego; Robert Rast, Poway, both of Calif.

[73] Assignee: General Instrument Corporation, Horsham, Pa.

[21] Appl. No.: 08/769,591

[22] Filed: Dec. 18, 1996

[51] Int. Cl.[6] .............................. H04N 5/445; H04N 5/46; H04N 7/10; H04N 7/14

[52] U.S. Cl. .............................. 348/6; 348/569; 348/734; 348/906; 348/10; 455/6.1; 455/6.2; 455/4.2; 455/5.1

[58] Field of Search ...................................... 348/569, 570, 348/731, 732, 906, 6, 7, 8, 10, 1, 9, 12, 13, 555, 734; 455/6.2, 6.3, 6.1, 2, 4.2, 5.1; H04N 5/445, 7/14, 7/10, 5/46

[56] References Cited

U.S. PATENT DOCUMENTS

| | | | |
|---|---|---|---|
| 5,542,093 | 7/1996 | Bodin | 455/33.2 |
| 5,550,576 | 8/1996 | Kosterman | 348/6 |
| 5,585,866 | 12/1996 | Miller | 348/731 |
| 5,600,378 | 2/1997 | Wasilewski | 348/468 |
| 5,673,089 | 9/1997 | Yuen | 348/734 |
| 5,798,785 | 8/1998 | Hendricks | 348/1 |
| 5,808,694 | 9/1998 | Usui | 348/569 |
| 5,828,945 | 10/1998 | Klosterman | 348/908 |
| 5,867,207 | 2/1999 | Channey | 348/7 |
| 5,883,680 | 3/1999 | Nykerk | 348/734 |
| 5,900,915 | 5/1999 | Morrison | 348/906 |

*Primary Examiner*—John K. Peng
*Assistant Examiner*—Wesner Sajous
*Attorney, Agent, or Firm*—Barry R. Lipsitz; Ralph F. Hoppin

[57] ABSTRACT

A television viewer can easily navigate programs which are grouped according to a common service provider or other grouping criteria by depressing the "channel up" or "channel down" buttons on a hand-held remote control. Programming services which are provided via one or more transmission paths are integrated, thereby allowing a viewer to successively select the grouped channels regardless of the broadcast signal, transmission path, frequency spectrum, transport stream and/or PID in which the channel is carried. Data is provided with broadcast signals to indicate broadcast address information which corresponds to a primary channel and one or more secondary channels of a channel group. A viewer can successively view the channels of the group while bypassing intermediate non-group channels. Grouped channels can thus be designated by a common channel designator such as a channel number. Goodwill and brand loyalty which has been built up over time in a local station channel number can be used to define a family of programs to maintain continuity as channels are added or dropped, or channel assignments of programming services are rearranged.

32 Claims, 2 Drawing Sheets

NAVIGATION AMONG GROUPED TELEVISION CHANNELS

BACKGROUND OF THE INVENTION

The present invention relates to an apparatus and method for grouping a number of television channels according to a grouping criteria. The invention is particularly suitable for grouping channels which originate from a common programming service provider such as a television network, and can be used to integrate programming services which are provided via different broadcast signals in different transmission paths.

Recently, there has been a rapid increase in the number of available television channels due to the advent of digital television transmission schemes such as MPEG-2 and Digicipher® II. A digital television signal can be compressed to fit into a much narrower frequency spectrum than a conventional analog signal. In fact, with proposed schemes, up to ten or more standard definition television (SDTV) channels, or two high definition television (HDTV) channels can fit into the 6 MHz bandwidth which conventionally carries only one analog television channel. Accordingly, there has been significant interest in providing a hybrid communication scheme where some of the channel allocations are used to provide digital television signals, while the remaining allocations carry analog signals. Such a hybrid scheme is expected to provide a transition to an all-digital system by allowing broadcasters to continue transmitting their conventional analog television channel while concurrently transmitting one or more new digital channels.

Currently, frequency allocations for terrestrial broadcast television in the United States range from 54 to 806 MHz, with channels that are each 6 MHz in width. In accordance with governmental regulations, e.g., from the Federal Communications Commission (FCC) in the United States, the channels are numbered successively from two to sixty-nine. For example, channel 2 corresponds to a frequency band of 54–60 MHz, and channel 3 corresponds to a frequency band of 60–66 MHz. However, with the large increase in television channels and available programming, there is a need to organize the programs to meet the needs of viewers and programming service providers. In addition, programming service providers wish to maintain a strong brand identity (e.g., with respect to their given broadcast channel number) even when one service provider offers several different programming choices on different channels. For instance, the programming service provider Home Box Office® (HBO) has different channels which are identified by the designations HBO, HBO-2, HBO-3 and so on. Moreover, nationwide and regional programming service providers wish to maintain a strong association with local affiliates which may provide programming such as local news, sports, features and the like. For instance, a national network broadcaster such as the National Broadcasting Company® (NBC) has numerous local affiliate stations. Many of the local affiliates have a strong brand identity in the channel number corresponding to their allocated frequency band which they would like to maintain and build (e.g., "Channel 2 news").

Similarly, viewers wish to have a simple and understandable way of selecting from the available programming services, even when channels are being added or dropped, or the channel assignments of existing programming services are rearranged. In particular, it would be convenient for viewers to have the ability to select among the channels offered by a common service provider by operating a handheld remote control or the like with "channel up" and "channel down" buttons.

With existing television systems, channels which are associated with a common programming service provider, for example, cannot be easily accessed with the channel up or channel down function since the associated channels are not usually contiguous. For example, when channels 2 and 20 are associated, a viewer would have to depress the channel up button and sequence through 18 channels to move from channel 2 to channel 20. This is time-consuming and inconvenient. Moreover, although the viewer has the option of entering the desired channel number directly using the numeric keypad of the remote control, this requires the viewer to know the channel numbers of the grouped channels. Moreover, the programming service provider may lose the viewer if the viewer happens to sequence through a channel which he finds more interesting than the next channel offered by that programming service provider. Of course, the programming service provider has a strong interest in maintaining viewership in order to set profitable advertising rates.

Grouped television programs may be provided via different broadcast signals which are provided over different transmission paths. For example, a television program such as a nationwide network news program may be transmitted via a direct broadcast satellite (DBS) system which is received via a satellite dish at the viewer's home. However, programming from a local affiliate in a terrestrial broadcast signal cannot be received by the viewer unless he switches the DBS system off and tunes in the local program using a conventional "rabbit ear" antenna or the like. Moreover, additional associated programming may be available only via yet another transmission path such as a cable television (CATV) distribution system. Furthermore, with other proposed broadcast schemes such as multi-point microwave distribution systems (MMDS), it can be seen that the available options can quickly overwhelm many viewers.

Accordingly, it would be desirable to provide a system which allows a viewer to easily navigate programs which are grouped according to a common service provider or other grouping criteria by depressing the "channel up" or "channel down" buttons on a hand-held remote control or the like. Additionally, it would be desirable to provide a system for integrating programming services which are provided via one or more transmission paths. The system should allow a viewer to successively select the grouped channels regardless of the broadcast signal, transmission path and/or frequency spectrum in which the channel is carried. The system should also allow the grouped channels to be designated by a common channel designator such as a channel number. The present invention provides a system having the above and other advantages.

SUMMARY OF THE INVENTION

In accordance with the present invention, an apparatus and method are presented for allowing a viewer to easily navigate programs which are grouped according to a common service provider or other grouping criteria by depressing the "channel up" or "channel down" button on a handheld remote control or the like. The system integrates programming services which are provided via one or more transmission paths, thereby allowing a viewer to successively select the grouped channels regardless of the broadcast signal, transmission path, frequency, transport stream and/or PID in which the channel is carried. Moreover, the system allows the grouped channels to be designated by a common channel designator such as a channel number.

In a method for grouping a plurality of broadcast programming services which are provided in corresponding channels, a number of the channels are grouped in a first channel group according to a desired first grouping criteria such as a common programming service provider. Not all channels need be members of a group. In fact, it is expected that there will be a number of non-group, independent channels along with the channels which are grouped in accordance with the present invention. Within the first channel group, a primary channel and at least one secondary channel will generally be determined, although it is possible to have only one channel in a group. The primary channel programming service is carried in a corresponding "broadcast address" which, for an analog signal, may define a frequency spectrum and, for a digital signal, may define a transport stream including PID information as well as a frequency at which the transport stream is provided. Similarly, the secondary channel programming services are carried at corresponding broadcast addresses. The user can successively select the programming services of the first channel group according to a user control signal such as a "channel up" or "channel down" command from a hand-held remote control.

The primary channel programming service may be carried in a primary broadcast signal, while the secondary channel programming services may be carried in a secondary broadcast signal, and the primary and secondary broadcast signals may be provided over respective different transmission paths. The transmission paths may include a direct broadcast satellite path, a cable distribution path, a terrestrial broadcast path, and a multi-point microwave distribution system path, for example. Moreover, path select data may be provided with the broadcast programming services for identifying the transmission paths.

In a particular embodiment, the primary channel programming service is carried as an analog signal, and the secondary channel programming services are carried in one or more packetized multiplexed digital signals. PID data is provided to distinguish the programming services from one another in a packetized multiplexed digital transport stream. Alternatively, both the primary and secondary channel programming services may be carried as digital signals, or the primary channel may be digital while some or all of the secondary channels are analog.

A "virtual channel" record which associates the primary channel with the broadcast addresses in which the secondary channels are carried in the corresponding broadcast signal is provided and stored locally (e.g., at the decoder). A "virtual channel map" comprises a plurality of virtual channel records. The virtual channel map is traversed by a channel up or channel down signal provided by a user.

When the user provides a channel increment command (e.g., channel up) and the current channel is the primary channel of the group, the secondary channel programming services are successively processed (e.g., one after another) for communication to the user, e.g., via a television screen and audio speaker, regardless of the broadcast signal or the location within a broadcast signal in which the secondary channel programming services are carried. Similarly, when the user control signal is a channel decrement (e.g., channel down) command and the current channel is a secondary channel, the lower secondary channels, if any, are successively selected, before returning to either the primary channel or the next non-group channel which follows or precedes the primary channel. Accordingly, the user can successively view the primary and secondary channels while skipping over (e.g., bypassing) any intermediate non-group channels.

Additionally, any number of channel groups may be provided (e.g., a movies group, a sports group, etc.), and the groups may include common channels. There may even be groups of channel groups, and so forth. The grouping criteria will generally be determined according to data transmitted with the programming services or provided to a decoder via an alternate route such as a smart card or telephone line.

A corresponding decoder is also presented.

DETAILED DESCRIPTION OF THE INVENTION

A method and apparatus are presented for allowing a viewer to easily navigate television programs which are grouped according to a common service provider or other grouping criteria by depressing the "channel up" or "channel down" button on a hand-held remote control or the like, thereby allowing a viewer to successively select the grouped channels regardless of the broadcast signal, transmission path and/or broadcast address in which the channel is carried.

Table 1 below shows a conventional grouping of channels which may currently exist. The first column is a "virtual channel designator", which is simply an assigned channel number. The designator is "virtual" since it is arbitrarily assigned. The second column indicates a "programming service provider", which may be the call letters of the television station or other source. The third column indicates the location of related channels. Here, virtual channel designators 200–202 correspond to the programming service provider call letters HBO, HBO-2 and HBO-3. respectively. Thus, with conventional schemes, the best that can be hoped for is that related channels are assigned to consecutive conventional channel numbers.

TABLE 1

| Virtual Channel Designator | Programming Service Provider | Description |
|---|---|---|
| 1 | WGN | |
| 2 | KTLA | |
| ... | | |
| 8 | KCST | |
| 9 | KUSI | |
| 10 | KGTV | |
| 11 | KPBS | |
| ... | | |
| 199 | Weather | |
| 200 | HBO | Related channels |
| 201 | HBO-2 | with consecutive |
| 202 | HBO-3 | channel numbers |
| 203 | CMX | |

Table 2 below shows a channel group in accordance with the present invention. In this example, a first channel group (e.g., the ABC group) includes channels 10 and 111–113. Additionally, channel 10 is defined as a "primary channel" while channels 111–113 are defined as "secondary channels" of the group. The primary channel represents a starting point from which a number of successive "channel up" steps can take a viewer through all channels in the group.

TABLE 2

| Virtual Channel Designator | Programming Service Provider | Description |
| --- | --- | --- |
| 1 | WGN | |
| 2 | KTLA | |
| ... | | |
| 8 | KCST | |
| 9 | KUSI | |
| 10 | KGTV | ABC Group, Primary Channel |
| 11 | KPBS | |
| ... | | |
| 110 | WHI | |
| 111 | ABC-1 | ABC Group, Secondary Channels |
| 112 | ABC-2 | |
| 113 | ABC-3 | |
| ... | | |
| 199 | Weather | |

A decoder which supports the channel group concept of the present invention can allow a viewer to easily move between (i.e., navigate) the channels of a group. For example, assume that channel 8 is a currently selected channel. Then, as the viewer presses a "channel up" (e.g., channel increment) button or the like on a hand-held remote control or similar device, the following sequence of virtual channels is selected: 9, 10, 111, 112, 113, 11, ... Thus, there is a "jump" from channel 10 to 111 since the intermediate channels 11 to 110 are bypassed, and a jump from channel 113 to 11 since the intermediate channels 112 to 12 are bypassed. Note that when a primary channel (e.g., channel 10) is the current channel and the viewer provides a channel up command, the next channel which is displayed will be one of the secondary channels (e.g., channel 111) of the group to which the primary channel belongs. Moreover, the viewer can switch directly to the other secondary channels until the last secondary channel is reached (e.g., channel 113). Thus, the viewer can successively view the channels of the ABC group without viewing non-group intermediate channels.

When the last secondary channel of a group is reached and the viewer provides yet another channel up command, the group is exited and the next virtual channel which follows the primary channel of the group is selected (e.g., channel 11). The viewer can then switch between the non-grouped channels in a conventional manner, e.g., successively from channel 11 to 12, 13 and so on.

If a currently-selected channel is in a group and the viewer provides a "channel down" (e.g., channel decrement) command, the viewer will successively switch between the secondary channels of the group in the opposite direction, and then jump to the non-group channel which is the next higher channel number following the primary channel. For instance, if channel 113 is the currently selected channel, the sequence may be: 112, 111, 11. Or, the sequence could return the viewer to the primary channel, e.g., in the sequence: 112, 111, 10, and thereafter to the channel which immediately precedes the primary channel of the group, e.g., channel 9. Alternatively, when the currently selected channel is any secondary channel of a group and a channel down command is issued, the next selected channel may be the primary channel even if intermediate secondary channels of the group are present. This is exemplified by the channel sequence: 113, 10. Moreover, although various modes are possible, it may be preferable when navigating a group for the channel sequence in the down direction to be the exact inverse of the channel sequence in the up direction. This is believed to be the mode that would be most convenient and easily understood by most viewers.

Additionally, other commands besides the channel up or channel down may be used to invoke a particular navigation sequence. For instance, a "home" button or the like on a remote control or similar interface device may be used to immediately select a primary channel of a current group or another designated channel. Alternatively, a viewer may select a particular command mode. For example, in a first mode, a channel down command will immediately select a primary channel when the current channel is a secondary channel. In a second mode, a channel down command will select intermediate secondary channels, if any, before returning to the primary channel. In a third mode, a channel down command will select intermediate secondary channels, if any, and will continue to select non-grouped channels which are adjacent to the secondary channels rather than returning to the primary channel. This third mode is exemplified by the channel sequence: 10, 111, 110, 109 and so on.

In the example of Table 2, the groups were defined according to a common programming service provider, sponsor or other proprietary entity. However, the groups may be determined according to various criteria such as a programming theme (e.g., sports, premium movies, networks, variety, children's programming, news, educational programming, and so on), popularity (e.g., group the ten most highly rated programming services based on Nielson ratings or total viewership in U.S. households), demographic factors (e.g., group programming services which are targeted toward families with young children), geography, or virtually any other factor.

Furthermore, the group concept can be extended to a group having channels which are separated by two or more sets of intermediate (e.g., non-group) channels. For example, two secondary channels may be separated by one or more non-group channels. Additionally, groups of two or more channel groups may be provided. For example, a viewer may wish to successively view channels belonging to a sports group, then successively view channels belonging to a movies group, and so forth.

Additionally, in some cases several different instances of programming from one national network which correspond to different time zones may be provided in a group. For instance, a group may include East coast feeds, Mountain states feeds, and West coast feeds of the same network programs. Thus, a viewer could successively view programming services from the same channel but in different time zones.

Moreover, the groups along with the sequencing mode may be determined according to data which is carried with the broadcast programming services, via a separate communication path such as a telephone line, or installed locally such as via a smart card or user input.

Regardless of the navigating mode or sequence, each channel will have a distinct virtual channel number, e.g., in the range from 1 to 999, which allows the viewer to directly access a channel by entering the number on a numerical keypad of a remote control. Alternatively, a graphical user interface (GUI) may be provided which allows a viewer to select channels. Thus, it will be understood that the viewer channel selection process is not limited to hand-held remote control devices but may include virtually any apparatus for selecting a channel, including pointing devices such as a mouse, or a keyboard, a touch screen, voice recognition systems, and so forth.

Figure 1:
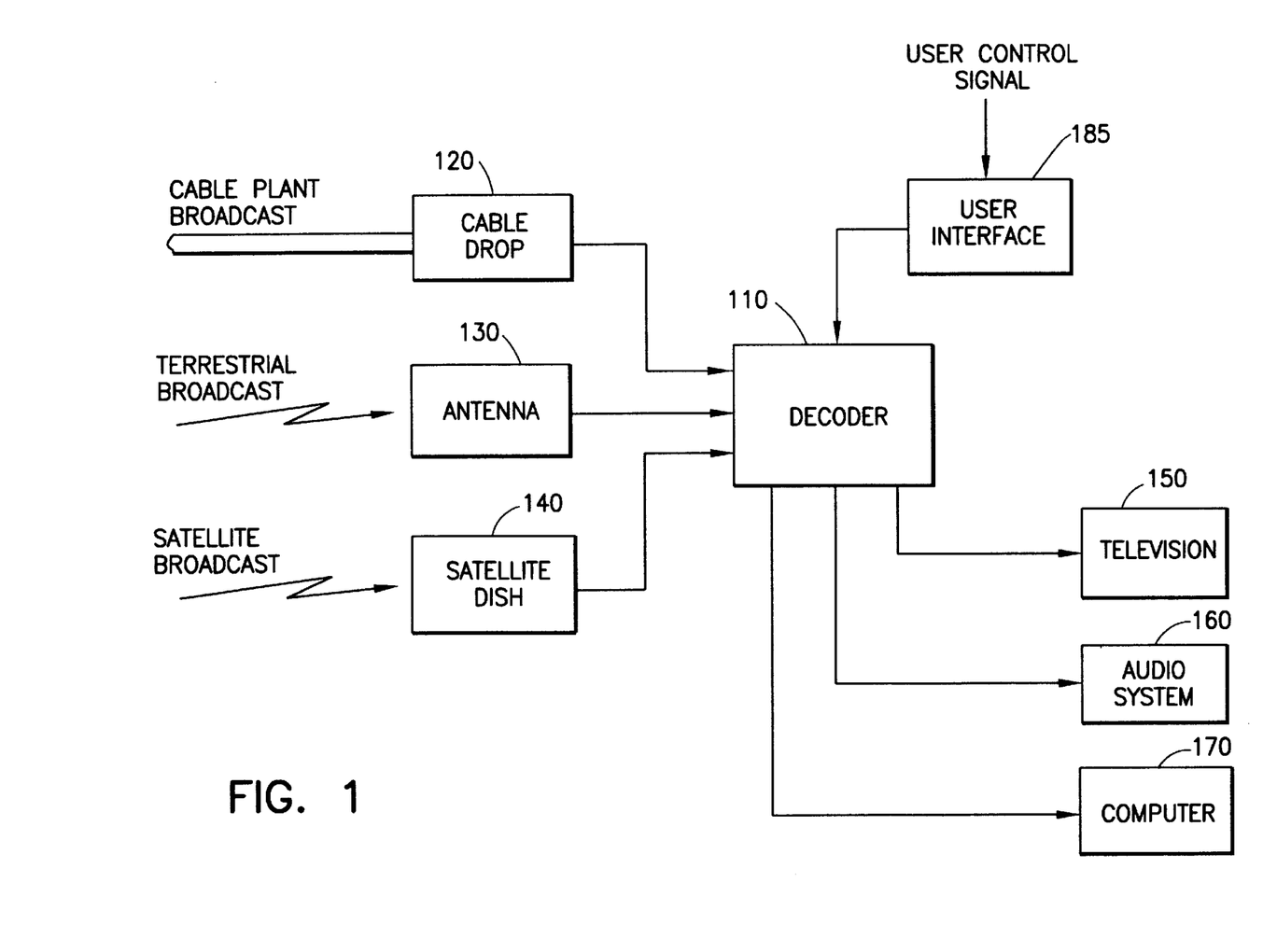
FIG. 1 is a schematic diagram of a communication system in accordance with the present invention.

FIG. 1 is a schematic diagram of a communication system in accordance with the present invention. FIG. 1 illustrates how the channel groups of the present invention can be integrated into a decoder system where both digital and analog signals are carried in respective frequency bands of one or more transmitted signals which may be carried in different transmission paths (e.g., terrestrial, DBS, CATV, MMDS). Here, three possible different transmission paths are shown. A cable plant broadcast signal is received at a cable drop 120 near a viewer's home. The cable broadcast may include analog and/or digital signals, but will be assumed to include only analog signals in the present example. A terrestrial broadcast, which, in a hybrid scheme, may include analog and digital signals in respective frequency bands, is received by an antenna 130 at the viewer's home. Finally, digital data from a satellite broadcast such as in a DBS system is received by a satellite dish 140 at the viewer's home.

Each of the received broadcasts are provided to a decoder 110 for processing. The decoder also receives an input from a user interface 185 which is responsive to a user control signal, which may be a channel up or channel down command from, e.g., a remote control as discussed previously. The decoder 110 processes one or more of the broadcast signals to provide the requested output in the form of a video signal to a television 150, an audio signal to an audio system 160 such as a home theater high-fidelity system, and/or a data signal to a computer 170. Other outputs may also be provided, for example, when home appliances, security or fire system or the like are integrated with the decoder.

Figure 2:
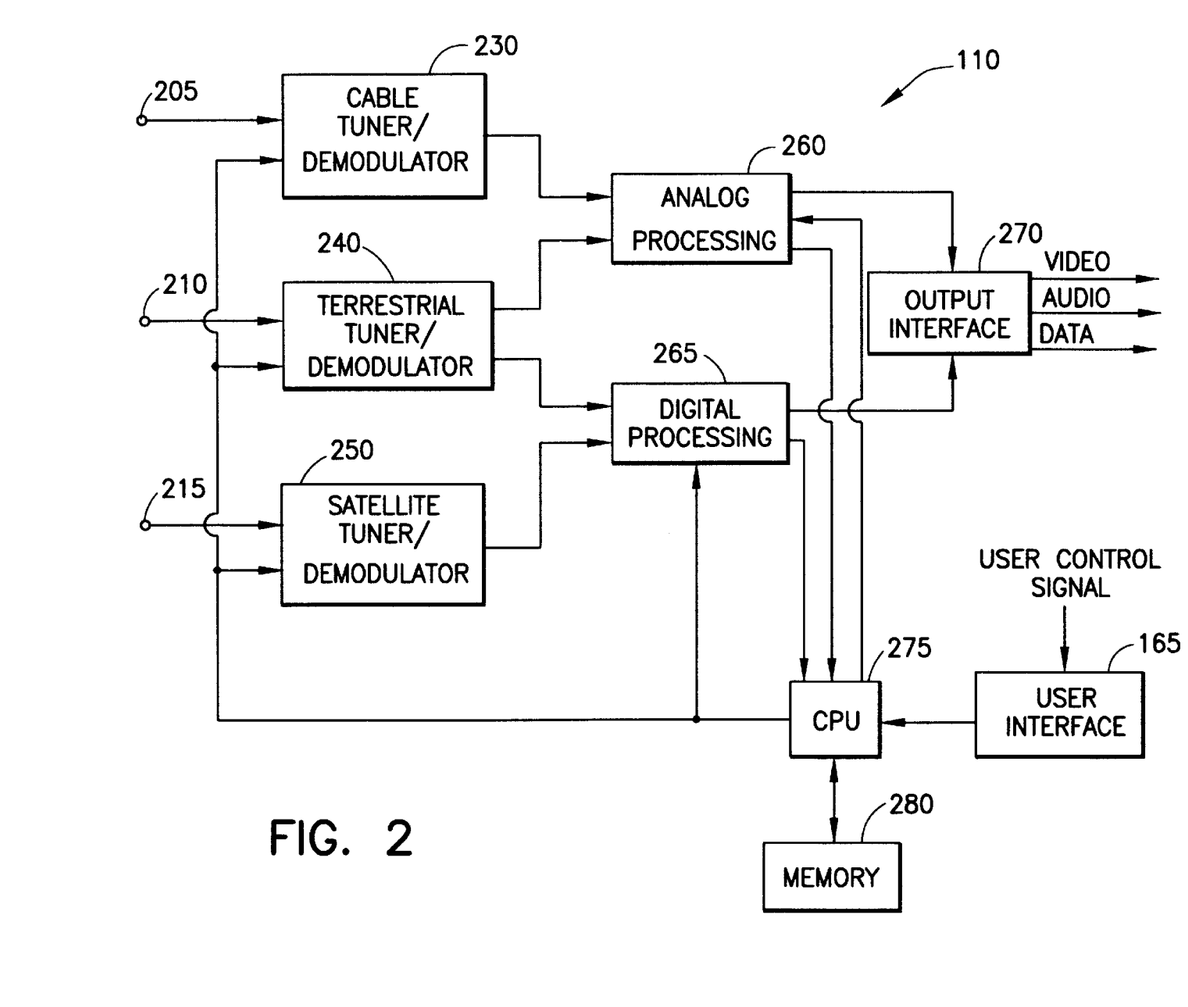
FIG. 2 is a schematic diagram of a decoder in accordance with the present invention.

FIG. 2 is a schematic diagram of a decoder in accordance with the present invention. While three or more different broadcast signals may be processed by the decoder 110, it will be understood that processing of only one of the broadcast signals at a given time may be required. Additionally, the decoder 110 is operable when only one broadcast signal is provided. The decoder 110 receives the cable broadcast signal via a terminal 205 and provides it to a cable tuner/demodulator 230 where a selected programming service signal may be retrieved. The retrieved programming service is processed by an analog processing function 260. The analog processing function 260 provides corresponding video, audio and/or data signals to an output interface 270 wherein the video, audio and/or data signals may be output to appropriate devices.

A terminal 210 receives a terrestrial broadcast signal which includes analog and digital signals in the present example and passes the signal to a terrestrial tuner/demodulator 240. The tuner/demodulator 240 retrieves a selected programming service and determines whether it is digital or analog. If the retrieved signal is analog, the signal is provided to the analog processing function 260. It should be understood that although the analog processing function 260 is shown as processing analog signals from both the cable broadcast and the terrestrial broadcast, this is not to say that each analog signal is identically processed. Different analog transmission schemes and transmission protocols must be accounted for according to the individual broadcast signal. Moreover, note that any combination of digital and/or analog signals may be provided in the broadcasts.

If the retrieved signal from the terrestrial tuner/demodulator 240 is digital, the signal is provided to the digital processing function 265, where video, audio and/or data processing is processed to recover the corresponding information. The digital processing function 265 receives broadcast address information from the central processing unit (CPU) 275 for identifying the PIDs in which the selected programming service is carried in the digital signal. Typically, data packets from up to ten or more digital programming services are packetized and multiplexed for delivery in a digital transport stream which is provided in an allocated frequency spectrum. The function 265 processes the appropriate data packets to provide the selected programming service to the output interface 270.

A terminal 215 receives a digital satellite broadcast signal such as from a DBS system and passes the signal to a satellite tuner/demodulator 250. The tuner/demodulator 250 retrieves the selected programming service according to the broadcast address information from the CPU 275 and provides it to the digital processing function 265. It should be understood that although the digital processing function 265 is shown as processing digital signals from both the terrestrial broadcast and the satellite broadcast, the processing of the digital signals may differ.

The CPU 275 may receive signals from the analog processing function 260 and/or the digital processing function 265 which indicate the transmission path of the signal, and/or provide channel grouping information (e.g., a virtual channel map or record). For an analog signal, the channel grouping information can be placed into the vertical blanking interval (VBI), for example. For a digital signal, channel grouping information may be carried in a virtual channel map which is provided in the transport stream. The CPU 275 also receives a user command which is indicative of a selected channel from the user interface 185 in response to the user control signal. For example, when the user issues a control signal using a hand-held infrared transmitter, the user interface 185 will include an infrared receiver. A memory 280 which is associated with the CPU 275 stores the transmission path and channel grouping data and may also maintain a record of user control signals and other relevant information. The CPU also provides a control signal including broadcast address information (e.g., frequency and/or PID) to the tuner/demodulators 230, 240 and/or 250 which is indicative of the selected channel so that the appropriate data can be retrieved.

Note that, in FIG. 2, various conventional processing steps such as demultiplexing, parsing, decryption and the like may be required but are not specifically shown. These steps are well known in the art.

In a first specific illustration of the decoder 110 of FIG. 2, assume that analog and digital terrestrial broadcast signals are received by the decoder (e.g., at terminal 210). Thus, only one broadcast signal tuner/demodulator (e.g., unit 240) need be provided. In this case, the other broadcast signal tuner/demodulators (e.g., units 230 and 250) need not be provided. For example, referencing Table 2, channel 10 is a local affiliate of ABC, a national programming service provider, and transmits a television signal via terrestrial broadcast in the frequency band (e.g., spectrum) from 192–198 MHz. Assume further that a hybrid terrestrial broadcast scheme is available where digital signals are carried in unused frequency bands or portions of the analog waveform such as the VBI. For example, ABC may transmit the programming services of channels having the call letters ABC-1, ABC-2 and ABC-3 in a packetized multiplexed digital signal which is carried in a 6 MHz band. Moreover, the band from 506–512 MHz may be unused in the area of the local affiliate. This band has been designated as channel 20 by the FCC. Alternatively, each of the channels ABC-1, ABC-2 and ABC-3 may be carried in separate bands in respective packetized multiplexed digital signals.

For marketing purposes, the national programming service provider may wish to have the three digital channels ABC-1, ABC-2 and ABC-3 identified with the original local analog channel, analog channel 10. The present invention makes this possible regardless of the transport stream and/or PIDs in which the three digital signals are carried. In particular, data may be transmitted with the analog channel 10 signal, for example, in the VBI, which identifies channel 10 as a primary channel of the ABC channel group. Similarly, data is provided with channels ABC-1, ABC-2 and ABC-3 which identifies them as secondary channels of the ABC channel group. Alternatively, the channel grouping information can be carried with the analog channel 10 signal, in an unused channel allocation, or via any other available means.

Assume a user provides a control signal to select channel 10. The CPU will provide the appropriate broadcast address information to the terrestrial tuner/demodulator 240 to recover the analog signal in the frequency band 192–198 MHz. The analog processing function 260 will subsequently process the analog signal to provide it in a form suitable for display on a television. Now assume the user wished to successively view the secondary channels in the ABC group. In accordance with the present invention, the user can provide a channel up control signal to the user interface 185. The CPU 275 will receive a corresponding control signal from the interface 185 and access data stored in the memory 280 to determine the appropriate broadcast address information (e.g., frequency, PID and/or other required parameter) of the first secondary channel in the group (namely channel ABC-1).

In this example, there is only one broadcast signal, namely the terrestrial broadcast signal received via terminal 210 information will provide the corresponding frequency spectrum and PID in which ABC-1 is carried. The CPU provides the appropriate broadcast address information to the terrestrial tuner/demodulator 240 and digital processing function 265 to retrieve the digital data in the 506–512 MHz frequency band. As mentioned, when data from two or more digital channels are provided in a common transport stream such as in a packet multiplex scheme, the broadcast address information provided by the memory includes a PID or other information which is required to distinguish one programming service from another.

The appropriate digital data will be retrieved and provided to the digital processing function 265. A corresponding signal which is suitable for display on a television will then be provided to the output interface 270. Thus, by simply providing a channel up command, the viewer can immediately switch from channel 10 in the 192–198 MHz band to channel ABC-1 in the 506–512 MHz band. The intermediate channels in the band from 198–506 MHz, and the non-group channels which may be carried in the transport stream in the 506–512 MHz band, are bypassed. Moreover, by continuing to provide a channel up command after channel ABC-1 has been selected, the viewer can switch directly to channels ABC-2 and ABC-3 in the transport stream in the 506–512 MHz band, and then to channel 11 in the 198–204 MHz band.

Note that channels ABC-1, ABC-2 and ABC-3 have been referred to in terms of their call letters and not by a numerical channel designator. In order to reinforce in the viewer's mind that particular channels are part of a group of a common service provider, for instance, it may be desirable to use the same channel designator of the primary channel, or a variation thereof, for the secondary channels. For instance, it may be desirable to provide a display on the decoder or the television, for instance, which informs the viewer that channels ABC-1, ABC-2 and ABC-3 are designated, respectively, "10.1", "10.2" and "10.3", or "10-A", "10-B" and "10-C," or the like. In this way, the viewer is reminded that channels ABC-1, ABC-2 and ABC-3 are related to channel 10, the viewer's well-known local affiliate. The secondary channels may be thought of as being "inside" the familiar channel 10, or somehow right next to channel 10 in the broadcast signal.

Moreover, even if channel 10 (e.g., local affiliate KGTV) moves to a different frequency spectrum, transport stream and/or PID, either as an analog or digital signal, the channel 10 group, or "family", of stations can still be maintained. In particular, the KGTV signal can be assigned to a virtual channel 10 to maintain a continuing identity with viewers. The designation "10" is "virtual" since it does not necessarily correspond to the FCC channel designation scheme or any particular frequency spectrum or PID location.

In a second specific illustration of the decoder 110 of FIG. 2, assume that three broadcast signals are received by the decoder 10 via three different transmission paths, i.e., a cable broadcast including analog channels, a hybrid terrestrial broadcast including both analog and digital channels, and a satellite broadcast including digital channels. In accordance with the user control signal, a desired channel is selected. The CPU 275 accesses the memory 280 to determine broadcast address information which corresponds to the selected channel. The corresponding tuner demodulator, e.g., tuner/demodulator 230, 240 or 250 is activated to retrieve the desired signal along with the function 265 for a digital signal, or the function 260 for an analog signal.

For example, assume a primary channel which is an analog channel in the terrestrial broadcast signal processed at tuner/demodulator 240 is the currently selected channel, that a first secondary channel is a digital signal in the terrestrial broadcast, that a second secondary channel is a digital signal in the satellite broadcast, and that a third secondary channel is an analog signal in the cable broadcast. Thus, when the user provides a channel up command, the CPU will send broadcast address information to the terrestrial tuner/demodulator 240 to tune and recover the corresponding digital signal for processing by the digital processing function 265. With another channel up command, the CPU will send corresponding broadcast address information to the satellite tuner/demodulator 250 to tune and recover the corresponding digital signal for processing by the digital processing function 265. With yet another channel up command, the CPU will send corresponding broadcast address information to the cable tuner/demodulator 230 to tune and recover the corresponding analog signal for processing by the analog processing function 260. Accordingly, there is an integration of each of the broadcast signals in the different transmission paths in a manner which is seamless to the user.

Implementation details of the channel group in accordance with the present invention will now be discussed. Table 2 mentioned above is a virtual table map since it relates a virtual channel designator such as a channel number with a particular programming service provider's signal. A syntax for a virtual channel record is defined in Table 3 below. Table 3 shows only the first part of a required record. The syntax is compatible with standards of the Advanced Television Systems Committee (ATSC) described in "System Information for Digital Television—ATSC Standard," Document A/56, Jan. 3, 1996, Advanced Television Systems Committee. The first column of the syntax contains the syntax element. The second column gives the length of the syntax elements in bits, and the third column identifies the syntax type. The types are "bslbf" (bit string left-most bit first) and uimbsf (unsigned integer most significant bit first).

All channels that are members of a common group appear with the same virtual channel message. That is, a virtual channel message is a self-contained definition of one part of the full channel map. One virtual channel message may define multiple channel groups. Table 3 shows the syntactic location of a group_member flag in the virtual channel structure.

The group_member flag, which is added to the syntax in accordance with the present invention, is a one-bit flag which provides a channel grouping mechanism. Specifically, the group_member flag is a Boolean flag that, when set, indicates that the virtual channel which is defined by the virtual_channel() record is part of a group. When the flag is clear, the channel is either not part of a group, or is a primary channel of a group. As discussed, a primary channel acts as a starting point for allowing a viewer to successively select the channels of a group. When one or more virtual_channel() records flagged group_member appears in a virtual channel message, the group_member is immediately preceded by the group's primary channel.

TABLE 3

| | Bits | Description |
|---|---|---|
| broadcast_virtual_channel(){ | | |
|   group_member | 1 | bslbf {no, yes} |
|   reserved | 3 | bslbf reserved |
|   virtual_channel_number | 12 | uimsbf range 0–4095 |
|   application_virtual_channel | 1 | bslbf {no, yes} |
|   . . . } | | |

For example, with the ABC group of Table 2, where channel 10 is the primary channel and channels 111–113 are the secondary channels, the corresponding virtual channel message which defines this part of the map that includes channel 10 would be constructed as follows in the order shown:
(1) Other channel definitions (optional);
(2) virtual channel 10 (group_member=0);
(3) virtual channel 111 (group_member=1);
(4) virtual channel 112 (group_member=1);
(5) virtual channel 113 (group_member=1);
(6) virtual channel 11 (group_member=0).

Virtual channels with the group_member attribute can be defined in increasing order of channel number as they appear in the virtual channel message. This stipulation will avoid ambiguity as to whether a channel up command takes the user to the next highest virtual channel number or to the next group member channel in the definition. When the user provides a channel down command, the channels may be selected in an order which is the reverse of the channel up order. Referencing Table 2, this is exemplified by the following channel sequence: 11, 113, 112, 111, 10, 9 and so on.

The way the group_member flag has been defined above, decoders that do not support the feature are unaffected. Accordingly, signal compatibility can be maintained for all users. Moreover, the change is transparent to fielded units as long as they correctly ignore reserved fields. A receiver that does support the group_member flag will be able to offer the user an optional, new method of navigation.

For satellite applications, the present invention provides a simplified way to assign channel numbers to ensure that growth in the number of channels does not exceed the allocated space (e.g., bandwidth). For example, the programming service provider HBO could be known as channel 100, and any number of additional HBO channels could be associated with channel 100.

Accordingly, it can be seen that the present invention provides an apparatus and method for allowing a viewer to easily navigate programs which are grouped according to a common service provider or other grouping criteria by depressing the "channel up" or "channel down" button on a hand-held remote control or the like. The system integrates programming services which are provided via one or more transmission paths, thereby allowing a viewer to successively select the grouped channels regardless of the broadcast signal, transmission path, frequency spectrum, transport stream and/or PID in which the channel is carried. Moreover, the system allows the grouped channels to be designated by a common channel designator such as a channel number to allow a television station to maintain an identity which is related to the channel number.

The invention is compatible with virtually any type of programming service, including television, information services such as stock prices and weather data, and audio/video programming implemented in software including games and other programming.

Although the invention has been described in connection with various specific embodiments, those skilled in the art will appreciate that numerous adaptations and modifications may be made thereto without departing from the spirit and scope of the invention as set forth in the claims.

What is claimed is:

1. A method for grouping a plurality of broadcast programming services which are provided in corresponding channels, comprising the step of:

grouping a first plurality of said channels in a first channel group according to a desired first grouping criteria;

said first channel group including a primary channel, and at least one secondary channel; wherein:

a user can successively select the programming services corresponding to said first channel group according to a user control signal and data that associates said primary channel with a broadcast address of said at least one secondary channel.

2. The method of claim 1, wherein:

said primary channel is associated with a programming service carried in a primary broadcast signal;

said at least one secondary channel is associated with a programming service carried in at least one secondary broadcast signal; and said primary and secondary broadcast signals are provided over respective different transmission paths.

3. The method of claim 2, wherein:

path select data is provided with said broadcast programming services for identifying transmission paths thereof.

4. The method of claim 1, wherein:

said primary channel carries its associated programming service as an analog signal, and said at least one secondary channel carries its associated programming service as a digital signal.

5. The method of claim 1, wherein:

said primary channel carries its associated programming service as a digital signal, and said at least one secondary channel carries its associated programming service as a digital signal.

6. The method of claim 1, wherein:

said data comprises a virtual channel record for associating said primary channel with the broadcast address of said at least one secondary channel.

7. The method of claim 1, wherein:

said primary channel is a currently selected channel; and said user control signal is a channel increment command;

said method comprising the further steps of:

using said data to select a broadcast address of the at least one secondary channel, in response to said channel increment command; and processing the selected secondary channel programming service for communication to the user;

thereby allowing the user to successively select said primary channel and said selected secondary channel without selecting channels which are not part of said first channel group.

8. The method of claim 7, wherein:

in response to said channel increment command, the user can successively select said primary channel and all of the secondary channels of the first channel group without selecting channels which are not part of said first channel group.

9. The method of claim 1, wherein:

one of the secondary channels of the first channel group is a currently selected channel; and said user control signal is a channel decrement command;

said method comprising the further steps of:

using said data to select a broadcast address of said primary channel, in response to said channel decrement command; and processing said primary channel programming service for communication to the user;

thereby allowing the user to successively select said selected secondary channel and said primary channel without selecting channels which are not part of said first channel group.

10. The method of claim 9, wherein:

in response to said channel decrement command, the user can successively select all of the secondary channels of the first channel group and said primary channel without selecting channels which are not part of said first channel group.

11. The method of claim 1, wherein:

said first grouping criteria is determined according to first grouping criteria data carried with said broadcast programming services.

12. A decoder for grouping a plurality of broadcast programming services which are provided in corresponding channels, comprising:

grouping means for grouping a first plurality of said channels in a first channel group according to a desired first grouping criteria;

said first channel group including a primary channel and at least one secondary channel; and a user interface for allowing a user to successively select the programming services corresponding to said first channel group according to a user control signal and data that associates said primary channel with a broadcast address of said at least one secondary channel.

13. The decoder of claim 12, wherein:

said primary channel is associated with a programming service carried in a primary broadcast signal;

said at least one secondary channel is associated with a programming service carried in at least one secondary broadcast signal; and said primary and secondary broadcast signals are provided over respective different transmission paths.

14. The decoder of claim 13, wherein:

path select data is provided with said broadcast programming services for identifying transmission paths thereof.

15. The decoder of claim 12, wherein:

said primary channel carries its associated programming service as an analog signal, and said at least one secondary channel carries its associated programming service as a digital signal.

16. The decoder of claim 12, wherein:

said primary channel carries its associated programming service as a digital signal, and said at least one secondary channel carries its associated programming service as a digital signal.

17. The decoder of claim 12, wherein:

said data comprises a virtual channel record for associating said primary channel with the broadcast address of said at least one secondary channel.

18. The decoder of claim 12, wherein:

said primary channel is a currently selected channel; and said user control signal is a channel increment command;

said decoder further comprising:

selecting means which uses said data to select a broadcast address of the at least one secondary channel, in response to said channel increment command; and a processor responsive to said selecting means for processing the selected secondary channel programming service for communication to the user;

thereby allowing the user to successively select said primary channel and the selected secondary channel without selecting channels which are not part of said first channel group.

19. The decoder of claim 18, wherein:

said selecting means is responsive to said channel increment command for allowing the user to successively select said primary channel and all of the secondary channels of said first channel group without selecting channels which are not part of said first channel group.

20. The decoder of claim 12, wherein:

one of the secondary channels is a currently selected channel; and said user control signal is a channel decrement command;

said decoder further comprising:

selecting means which uses said data to select a broadcast address of said primary channel, in response to said channel decrement command; and a processor responsive to said selecting means for processing said primary channel programming service for communication to the user;

thereby allowing the user to successively select said selected secondary channel and said primary channel without selecting channels which are not part of said first channel group.

21. The decoder of claim 20, wherein:

said selecting means is responsive to said channel decrement command for allowing the user to successively select all of the secondary channels part of said first channel group and said primary channel without selecting channels which are not part of said first channel group.

22. The decoder of claim 12, wherein:

said first grouping criteria is determined according to first grouping criteria data carried with said broadcast programming services.

23. The method of claim 1, wherein:

said plurality of broadcast programming services are provided via at least one of a direct broadcast satellite path, a cable distribution path, a terrestrial broadcast path, and a multi-point microwave distribution path.

24. The method of claim 1, wherein:

said plurality of broadcast programming services comprise television programming services.

25. The method of claim 1, wherein said first grouping criteria comprises at least one of:

common programming service provider;

programming theme of the programming services;

popularity of the programming services;

demographic factors associated with the user; and geographical location of the user.

26. A method for grouping a plurality of broadcast programming services which are provided in corresponding channels, comprising the steps of:

grouping a first plurality of said channels in a first channel group according to a desired first grouping criteria; wherein:

said first channel group includes a primary channel, and at least one secondary channel; and a user can successively select the programming services corresponding to said first channel group according to a user control signal; and grouping a second plurality of said channels in a second channel group according to a desired second grouping criteria; wherein:

said second channel group includes a primary channel thereof and at least one secondary channel thereof;

said channels of said second channel group are not all the same as said channels of said first channel group; and a user can successively select the programming services corresponding to said second channel group according to the user control signal.

27. A method for grouping a plurality of broadcast programming services which are provided in corresponding channels, comprising the steps of:

grouping a first plurality of said channels in a first channel group according to a desired first grouping criteria; wherein:

said first channel group includes a primary channel, and at least one secondary channel; and a user can successively select the programming services corresponding to said first channel group according to a user control signal; and providing respective multi-part channel designators for said primary channel and said at least one secondary channel, said designators including a first part which identifies said primary channel and said at least one secondary channel as being in said first channel group, and a second part which distinguishes said primary channel and said at least one secondary channel from one another.

28. The apparatus of claim 12, wherein:

said plurality of broadcasting services are provided via at least one of a direct broadcast satellite path, a cable distribution path, a terrestrial broadcast path, and a multi-point microwave distribution path.

29. The apparatus of claim 12, wherein:

said plurality of broadcast programming services comprise television programming services.

30. The decoder of claim 12, wherein said first grouping criteria comprises at least one of:

common programming service provider;

programming theme of the programming services;

popularity of the programming services;

demographic factors associated with the user; and geographical location of the user.

31. A decoder for grouping a plurality of broadcast programming services which are provided in corresponding channels, comprising:

grouping means for grouping a first plurality of said channels in a first channel group according to a desired first grouping criteria;

said first channel group including a primary channel and at least one secondary channel;

a user interface for allowing a user to successively select the programming services corresponding to said first channel group according to a user control signal;

means for grouping a second plurality of said channels in a second channel group according to a desired second grouping criteria;

said second channel group including a primary channel and at least one secondary channel; and a user interface for allowing a user to successively select the programming services corresponding to said second channel group according to the user control signal; wherein:

said channels of said second channel group are not all the same as said channels of said first channel group.

32. A decoder for grouping a plurality of broadcast programming services which are provided in corresponding channels, comprising:

grouping means for grouping a first plurality of said channels in a first channel group according to a desired first grouping criteria;

said first channel group including a primary channel and at least one secondary channel; and a user interface for allowing a user to successively select the programming services corresponding to said first channel group according to a user control signal; wherein:

said user interface provides respective multi-part channel designators for said primary channel and said at least one secondary channel, said designators including a first part which identifies said primary channel and said at least one secondary channel as being in said first channel group, and a second part which distinguishes said primary channel and said at least one secondary channel from one another.

* * * * *